(12) United States Patent
Pissey et al.

(10) Patent No.: US 10,430,173 B2
(45) Date of Patent: Oct. 1, 2019

(54) TECHNIQUES FOR UPDATING COMPONENTS OF A COMPUTER DEVICE WHILE ENABLING COMPONENTS FOR AVAILABILITY

(71) Applicant: Harman International Industries, Inc., Stamford, CT (US)

(72) Inventors: Abhinand Pissey, Ramanagara (IN); Shyju Thekkumbadan, Kannur (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 14/887,083

(22) Filed: Oct. 19, 2015

(65) Prior Publication Data
US 2017/0109152 A1    Apr. 20, 2017

(51) Int. Cl.
*G06F 8/65* (2018.01)
*G06F 8/654* (2018.01)

(52) U.S. Cl.
CPC ............... *G06F 8/65* (2013.01); *G06F 8/654* (2018.02)

(58) Field of Classification Search
CPC ...... G06F 8/65; G06F 11/1433; G06F 3/0607; G06F 3/1225; G06F 3/123
(Continued)

(56) References Cited

U.S. PATENT DOCUMENTS 5,978,916 A * 11/1999 Randall ................ G06F 9/454
717/168
6,247,168 B1 * 6/2001 Green ...................... G06F 8/60
717/176
(Continued)

FOREIGN PATENT DOCUMENTS

EP     2425333 B1 *  8/2017  ............... G06F 8/64

OTHER PUBLICATIONS

Kanstrén et al., "Definition of Core Requirements and a Reference Architecture for a Dependable, Secure and Adaptive Distributed Monitoring Framework", 2010, IEEE (Year: 2010).*
(Continued)

*Primary Examiner* — Wei Y Zhen
*Assistant Examiner* — Junchun Wu
(74) *Attorney, Agent, or Firm* — Artegis Law Group, LLP

(57) ABSTRACT

A computing device for receiving an update package comprising a plurality of updates for a plurality of hardware and/or software components of the computer device. An update engine may determine a time order for performing the updates based on relationships and groupings of the updates. The update engine may identify common groupings, interdependent groupings, and any independent updates in the received update package. The update engine may perform a common grouping update method for all identified common groupings and an interdependent grouping update method for all identified interdependent groupings. In the circumstance that all updates in the update package are determined to be independent updates, the update engine may perform an independent update method that enables a selected independent component to be made available at the beginning of the update period, while other components are updated and enabled, and then the selected independent component is updated last.

16 Claims, 6 Drawing Sheets

(58) Field of Classification Search
USPC .......................................................... 717/169
See application file for complete search history.

(56) References Cited

U.S. PATENT DOCUMENTS

| | | | | |
|---|---|---|---|---|
| 8,584,115 B2* | 11/2013 | Finkelstein | ............ | G06F 9/4411 717/168 |
| 8,799,888 B1* | 8/2014 | Fitzgerald | ................ | G06F 8/65 717/168 |
| 2006/0059481 A1* | 3/2006 | Smith | ...................... | G06F 8/65 717/173 |
| 2006/0206888 A1* | 9/2006 | Mavrinac | ................. | G06F 8/65 717/168 |
| 2008/0005733 A1* | 1/2008 | Ramachandran | ......... | G06F 8/65 717/168 |
| 2008/0066051 A1* | 3/2008 | Stubbs | ...................... | G06F 8/20 717/107 |
| 2008/0184210 A1* | 7/2008 | Lee | ...................... | G06F 8/4441 717/136 |
| 2009/0113410 A1* | 4/2009 | Halliday | ............ | G06F 17/30306 717/169 |
| 2010/0257517 A1 | 10/2010 | Sriram et al. | | |
| 2011/0209136 A1* | 8/2011 | Sims | ......................... | G06F 8/65 717/171 |
| 2011/0214121 A1* | 9/2011 | Gentile | ................. | H04L 43/065 717/177 |
| 2013/0097595 A1* | 4/2013 | Stern | ...................... | G06F 8/658 717/171 |
| 2013/0167119 A1* | 6/2013 | Lee | .......................... | G06F 8/36 717/121 |
| 2013/0311613 A1* | 11/2013 | Aleksandrov | ............. | G06F 8/65 709/219 |
| 2014/0222818 A1* | 8/2014 | Kikuchi | .............. | G06F 11/3006 707/737 |
| 2014/0245283 A1* | 8/2014 | Tanaka | ...................... | G06F 8/65 717/172 |
| 2014/0344797 A1* | 11/2014 | Rajagopalan | ........... | G06F 8/654 717/169 |
| 2014/0359593 A1* | 12/2014 | Cohen | ....................... | G06F 8/65 717/169 |
| 2015/0324185 A1* | 11/2015 | Boehnel | ................. | H05B 37/02 717/168 |
| 2016/0103672 A1* | 4/2016 | Ma | ........................ | H04L 41/082 717/168 |
| 2016/0117161 A1* | 4/2016 | Parthasarathy | ......... | H04L 67/06 717/171 |

OTHER PUBLICATIONS

Ibrahim et al., "On the relationship between comment update practices and Software Bugs", 2011, Elsevier (Year: 2011).*
Abu-Eid, "Raising Web Service Updates Efficiency with Dynamic Technologies", 2008, IEEE (Year: 2008).*
Blow et al., "Updates in the AquaLogic Data Services Platform", 2009, IEEE (Year: 2009).*
Partial European Search Report for Application No. 16194490.5 dated Mar. 6, 2017.
Extended European Search Report for Application No. EP 16194490.5 dated Jul. 6, 2017, 13 pages.

* cited by examiner

TECHNIQUES FOR UPDATING COMPONENTS OF A COMPUTER DEVICE WHILE ENABLING COMPONENTS FOR AVAILABILITY

BACKGROUND

Field of the Embodiments

The various embodiments relate generally to computer science and, more specifically, to techniques for updating components of a computer device while enabling components for availability.

Description of the Related Art

Currently, components of computer devices need to be updated frequently to ensure that the components are running the latest software and firmware features. Such components may include hardware components and/or application programs/services. Hardware components are usually updated via firmware updates, and application programs/services are usually updated via software updates. For example, a consumer electronics device (such as a GPS device, cellphone, vehicle head unit, etc.) can be updated via an update package that can be downloaded and executed on the consumer electronics devices. The update package may include separate updates for specific components of the consumer electronics device. For example, the update package may include an update for a media application service, a separate update for a media hardware component, another separate update for a traffic application service, etc.

Conventionally, when performing the updates, the computer device is put into a special programming mode where all components within the computer device are disabled and the different features of the different components are not made available to a user for use until the updates are completed. As the update time may be considerable, the computer device may be unusable for a significant period of time. Further, if the update requires several firmware updates to hardware components, then the period of time that the computer device is unusable may be prolonged as firmware updates take particularly long periods of time to complete.

As the foregoing illustrates, what would be useful to end users are more effective techniques for updating the different components of a computer device.

SUMMARY

One or more embodiments set forth include a computer-implemented method for determining that a plurality of updates includes a first update that is associated with a first component and is a common update to a second update and a third update. The second update is associated with a second component that is dependent on the first component, and the third update is associated with a third component that is dependent on the first component. The method further includes performing the first update on the first component before performing the second update on the second component and before performing the third update on the third components.

Further embodiments provide, among other things, a computer device and computer-readable storage medium to implement various aspects of the system set forth above.

At least one advantage of the disclosed technique is that it allows some components of a computer device to be enabled and made available for use by an end user while other components of the computer device are updated during an update period. The disclosed technique therefore enables a user to access and use at least some features of the computer device during the update period.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Components of Computing Device for Updating

Figure 1:
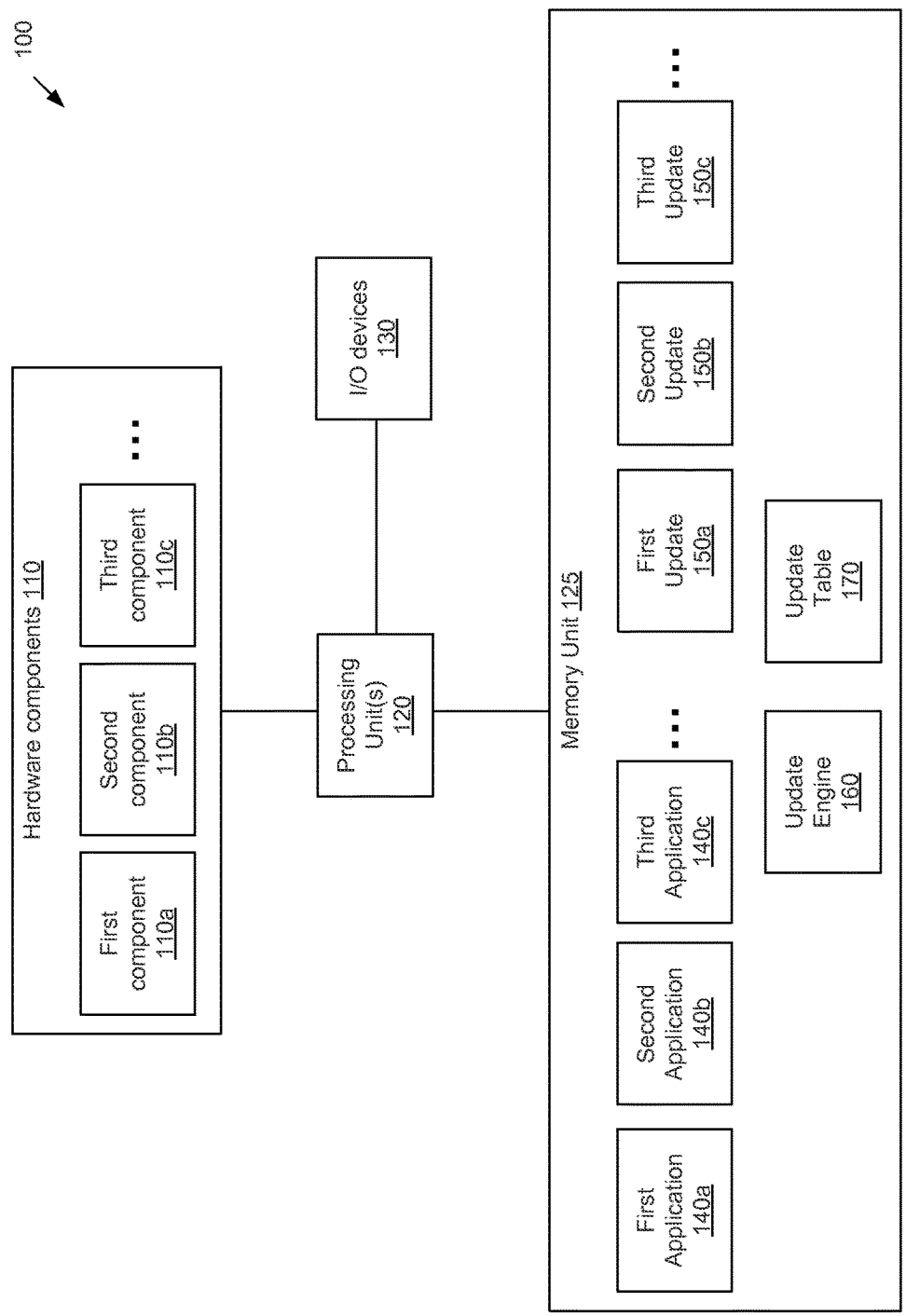
FIG. 1 illustrates a computing device configured to implement one or more aspects of the various embodiments.

FIG. 1 illustrates a computing device 100 configured to implement one or more aspects of the various embodiments. As shown, the computing device 100 includes, without limitation, one or more processing units 120 coupled to a plurality of hardware components 110, memory unit 125, and input/output (I/O) devices 130. Computing device 100 may be, for example, a server system, client system, laptop computer, tablet or hand-held device, consumer device (such as navigation system, vehicle infotainment or audio system, digital camera, etc.), or any other type of computing device.

Processing unit(s) 120 may be a central processing unit (CPU), a graphics processing unit (GPU), or a combination of different processing units, such as a CPU configured to operate in conjunction with a GPU. In general, processing unit 120 may be any technically feasible hardware unit capable of processing data and/or executing software applications.

I/O devices 130 includes input devices capable of receiving user input, output devices capable of generating output, as well as network devices capable of communicating via a network (not shown). Examples of input devices include a keyboard, a mouse, a touchscreen, a microphone, or other input elements. Examples of output devices include a monitor, a printer, or other output elements. The I/O devices 130 may comprise an interface. The interface may include knobs, switches, sliding components, buttons, a mouse, keyboard, a display, a touch screen or other devices or mechanisms capable of receiving user inputs for adjusting, modifying or controlling one or more features of the computer device 100 and providing outputs sensed by a user. The interface may be used to manipulate one or more characteristics, components, or features of the computer device 100. The input and output devices allow an end-user access to features of hardware and/or application components of the computer device 100.

The hardware components 110 may comprise a plurality of hardware components 110 such as first component 110a, second component 110b, third component 110c, etc. A hardware component 110 may comprise an integrated circuit (IC), system on a chip (SoC), embedded system, chip, microcontroller, or the like. A hardware component 110 may be a specialized circuit for providing specific features. A non-exhaustive list of examples of hardware components 110 include audio processor, media chip, tuner chip, display controller chip, GPS chip, network interface controller chip, touch control chip, control-panel chip, phone chip, etc. In other embodiments, other types of hardware components 110 are used. Each hardware component 110 may comprise a non-volatile memory device (such as ROM, EPROM, flash memory, etc.) for storing embedded software (firmware).

Memory 125 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 125 may be an external storage device or database for storing recorded data. Examples include a hard drive, compact disc ("CD"), digital video disc ("DVD"), memory card, memory stick, floppy disc, universal serial bus ("USB") memory device, or any other device operative to store data. The memory 125 may be operable to store instructions executable by the processors 120.

Memory unit 125 may include a plurality of application programs/services 140, such as first application 140a, second application 140b, third application 140c, etc. An application program may provide a specialized application service for providing specific features. A non-exhaustive list of examples of application programs/services 140 include a traffic service, tuner service, navigation service, media service, user interface service, network service, connectivity service (e.g., applications for Bluetooth, Infrared etc), driver assistance service (e.g., applications for reverse camera, parking sensors etc), phone service, etc. In other embodiments, other types of application programs/services 140 are used.

The hardware components 110 are referred to herein as hardware components of the computer device 100 and the application programs/services 140 are referred to herein as software components of the computer device 100. Collectively, the hardware components 110 and application programs/services 140 are referred to herein as components of the computer device 100. Note that some hardware components 110 and application programs/services 140 may have similar names (such as media chip and media service, phone chip and phone service, etc.), but the hardware components 110 and application programs/services 140 are separate and distinct components of the computer device 100.

The firmware for a hardware component 110 may be updated periodically by a firmware update to reprogram the firmware, for example, to fix bugs, apply security patches, or add new features to the hardware component 110. Likewise, an application program/service 140 may be updated periodically by an application update, for example, to fix bugs or add new features to the application program/service 140. In this regard, the memory 125 may also include a plurality of updates 150, such as first update 150a, second update 150b, third update 150c, etc. The plurality of updates 150 may comprise an update package. The update package may be received and stored to the computer device 100, for example, through a network connection (e.g., Internet download), USB connection, CD, DVD, SD card, or any other feasible manner for loading and storing an update package to the computer device 100. In other embodiments, the software update can be performed via Over The Update (OTA) or via Diagnostic interface.

The memory 125 may also include an update engine 160 that performs update techniques described herein. In particular, the update engine 160 may implement one or more update techniques that increase the number of hardware and/or software components of the computer device 100 and the amount of time the components are enabled and made available to the user during the update period. The update techniques may be based on the relationships between the components of the computer device 100 that are to be updated. In some embodiments, the update engine 160 uses an update table 170 to perform the update techniques described herein.

A hardware component may be enabled using various methods known in the art. For example, the hardware component may require a reset to be enabled, or the entire computer device may require a restart for the hardware component to be enabled. An application program/service (software component) may be enabled using various methods known in the art. For example, the application program/service may require termination and restarting of the application program/service to be enabled. When a hardware component or software component (application program/service) is enabled, it is considered to be available to the user whereby the features and functions of the hardware or software component is accessible and available for use. Thus, an enabled hardware or software component is running and operational and providing its features and functions for use by the user.

Relationships and Groupings of Updates and Components

Figure 2:
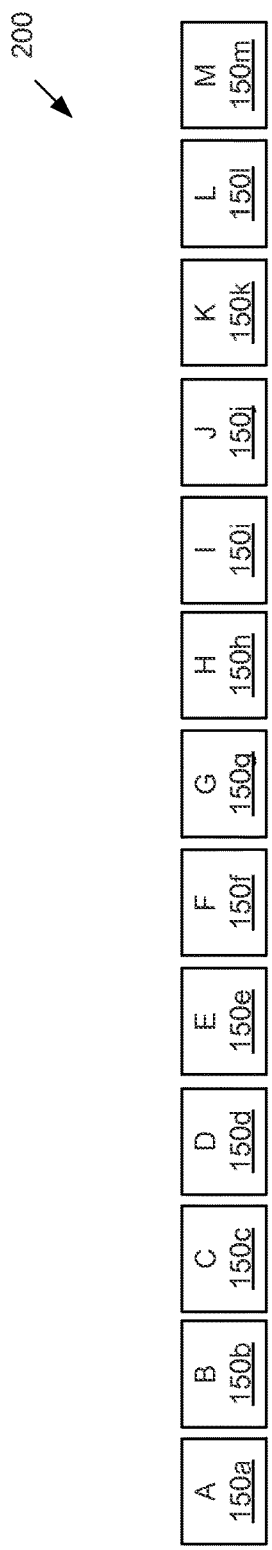
FIG. 2 is a conceptual diagram of an update package, according to the various embodiments.

FIG. 2 is a conceptual diagram of an update package, according to the various embodiments. As shown in the example of FIG. 2, the update package 200 comprises a plurality of updates 150a-m (marked as updates A-M in FIG. 2). An update 150 may comprise a firmware update for a hardware component 110 or an application update for an application program/service 140. Also, an update 150 comprises a firmware update for a specific hardware component 110 or an application update for a specific application program/service 140. Thus, each update A-M has a corresponding hardware or application component A-M on which the update is to be performed. For example, update C may comprise a firmware update to be performed on a hardware component C (e.g., GPS chip), update G may comprise an application update to be performed on an application component G (e.g., phone service), etc. In some embodiments, each update 150 may include metadata that specifies a component identifier (ID) that identifies a corresponding component (hardware component 110 or application program/service 140) to which the update 150 is to be applied.

In some embodiments, the time order that the updates 150 in the update package 200 are performed is based on the relationships between the components to be updated. In these embodiments, components may comprise independent, dependent, common, and/or interdependent components. Note that the relationships between the components are determined based only on the components that are to be updated by the update package 200, and not based on all components of the computer device 100. Typically, the components to be updated by the update package 200 is only a sub-set of all components of the computer device 100. Also, relationships between updates 150 in the update package 200 correspond to the relationships between the components to be updated by the updates 150.

An independent component (to be updated) may comprise a component that does not depend/rely on any other component (to be updated) for the independent component to be operational. Therefore, an independent update may comprise an update 150 for an independent component.

A first component (to be updated) may be dependent on a second component (to be updated) if the first component depends/relies on the second component to be operational. The first component is referred to as a dependent component. A common component may comprise a component (to be updated) that one or more other components (to be updated) depend/rely on to be operational. For example, if first and second components are both dependent on a third component for the first and second components to be operational, the third component is a common component for the first and second components. A common update may comprise an update 150 for a common component. The one or more dependent components and their common component (e.g., the first, second, and third components) may be referred to herein as a "common grouping" of components. Also, the corresponding updates 150 for the common grouping of components may be referred to herein as a common grouping of updates 150.

Interdependent components may comprise components that are each dependent on each other to be operational. For example, first and second components are interdependent if the first component is dependent on the second component to be operational and the second component is dependent on the first component to be operational. In other words, interdependent components are dependent in both directions. Interdependent components may be referred to herein as an "interdependent grouping" of components. Note that an interdependent grouping may also comprise three or more interdependent components, each component being dependent on each of the other components in the grouping. Interdependent updates may comprise updates 150 for interdependent components. The corresponding updates 150 for an interdependent grouping of components may be referred to herein as an interdependent grouping of updates 150.

As discussed above, a first component may be dependent on a second component if the first component depends/relies on the second component to be operational. In some embodiments, this means that the second component provides one or more functions/services to the first component that are needed for the first component to operate properly, whereby without the one or more functions/services the first component will not be able to execute as configured.

The update engine 160 may determine the relationships between the components (to be updated) and the updates 150 of the update package 200 and any common and/or interdependent groupings of components and updates. Based on the determined relationships and groupings, the update engine 160 may determine the time order of the updates 150 to be performed (relative to the other updates 150 in the update package 200).

In some embodiments, each update 150 may include metadata that specifies a grouping identifier (ID). The grouping ID for an update 150 may specify a particular grouping that the update 150 belongs to, the type of grouping (common or interdependent grouping), and/or whether the update 150 is a common update. For example, the grouping ID may indicate that an update 150 belongs to a second grouping that is an interdependent grouping of updates. As another example, the grouping ID may indicate that an update 150 belongs to a third grouping that is a common grouping of updates, and that the update 150 is the common update (and thus not a dependent update). If a grouping ID for an update 150 is empty (null), this may indicate that the update 150 is an independent update for an independent component. In these embodiments, the relationships and groupings of the updates 150 are determined when the update package 200 is produced. When the update package 200 is received at the computer device 100, the update engine 160 then parses the metadata in the grouping IDs to identify the relationships and groupings of the updates 150.

In other embodiments, each update 150 may include metadata that specifies an update identifier (ID) and the update package 200 may include metadata that specifies an update table 170. The update table 170 may include a plurality of entries for update IDs, each entry specifying information for a particular update ID. For example, an entry for a particular update ID may specify types of groupings (common or interdependent) that the update may belong to, the update IDs of other updates in the grouping(s), and whether the update is a common update in a common grouping. If an entry for a particular update ID is empty (null), this may indicate that the update 150 is an independent update for an independent component. In these embodiments, the relationships and groupings of the updates 150 are determined after the update package 200 is produced and received by the computer device 100, whereupon the update engine 160 then parses the metadata in the update IDs and the update table 170 to identify the relationships and groupings of the updates 150.

Figure 3:
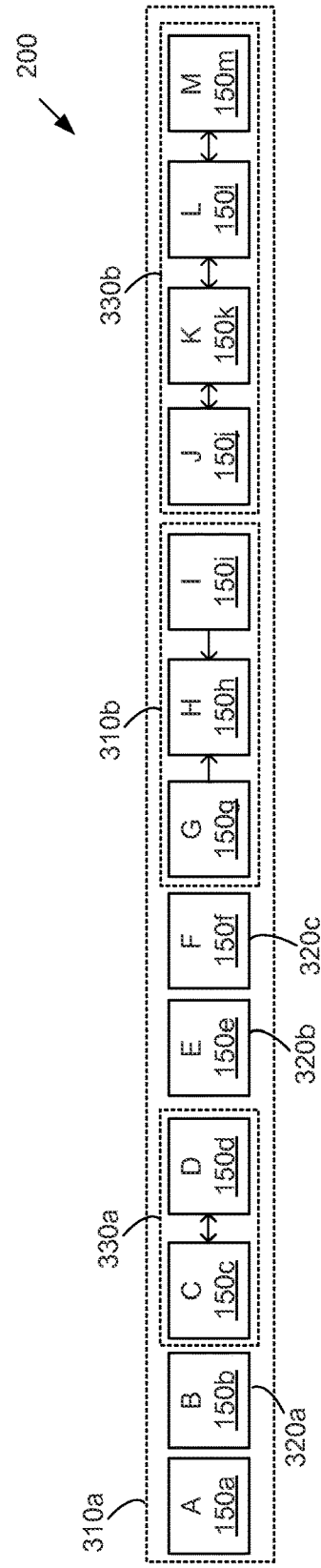
FIG. 3 is a conceptual diagram of relationships and groupings for the update package of FIG. 2, according to the various embodiments.

FIG. 3 is a conceptual diagram of relationships and groupings for the update package 200 of FIG. 2, according to the various embodiments. As shown in the example of FIG. 3, the update relationships and groupings determined by the update engine 160 include a common grouping 310*a-b*, independent updates 320*a-c*, and interdependent groupings 330*a-b*.

A first common grouping 310*a* includes all updates 150*a-m* (marked A-M), whereby all updates 150*b-m* (marked B-M) are dependent on a common update 150*a* (marked A). Note that updates A-M are for components A-M, respectively, whereby components B-M are dependent on common component A. A second common grouping 310*b* includes updates 150*g-i* (marked G-I), whereby updates 150*g* and 150*i* (marked G and I) are dependent on a common update 150*h* (marked H). Note that updates G-I are for components G-I, respectively, whereby dependent components G and I are dependent on common component H.

Independent updates 320a-c include a first independent update 150b (marked B), a second independent update 150e (marked E), and a third independent update 150f (marked F). Note that updates B, E, and F are for components B, E, and F, respectively, whereby components B, E, and F are each independent components.

A first interdependent grouping 330a includes updates 150c-d (marked C-D), whereby updates 150c-d are each dependent on each other. Note that updates C-D are for components C-D, respectively, whereby components C-D are interdependent. A second interdependent grouping 330b includes updates 150j-m (marked J-M), whereby updates 150j-m are each dependent on each other. Thus, update J depends on updates K, L, M; update K depends updates on J, L, M; update L depends on updates J, K, M; and update M depends on updates J, K, L. Note that updates J-M are for components J-M, respectively, whereby components J-M are interdependent.

Figure 4:
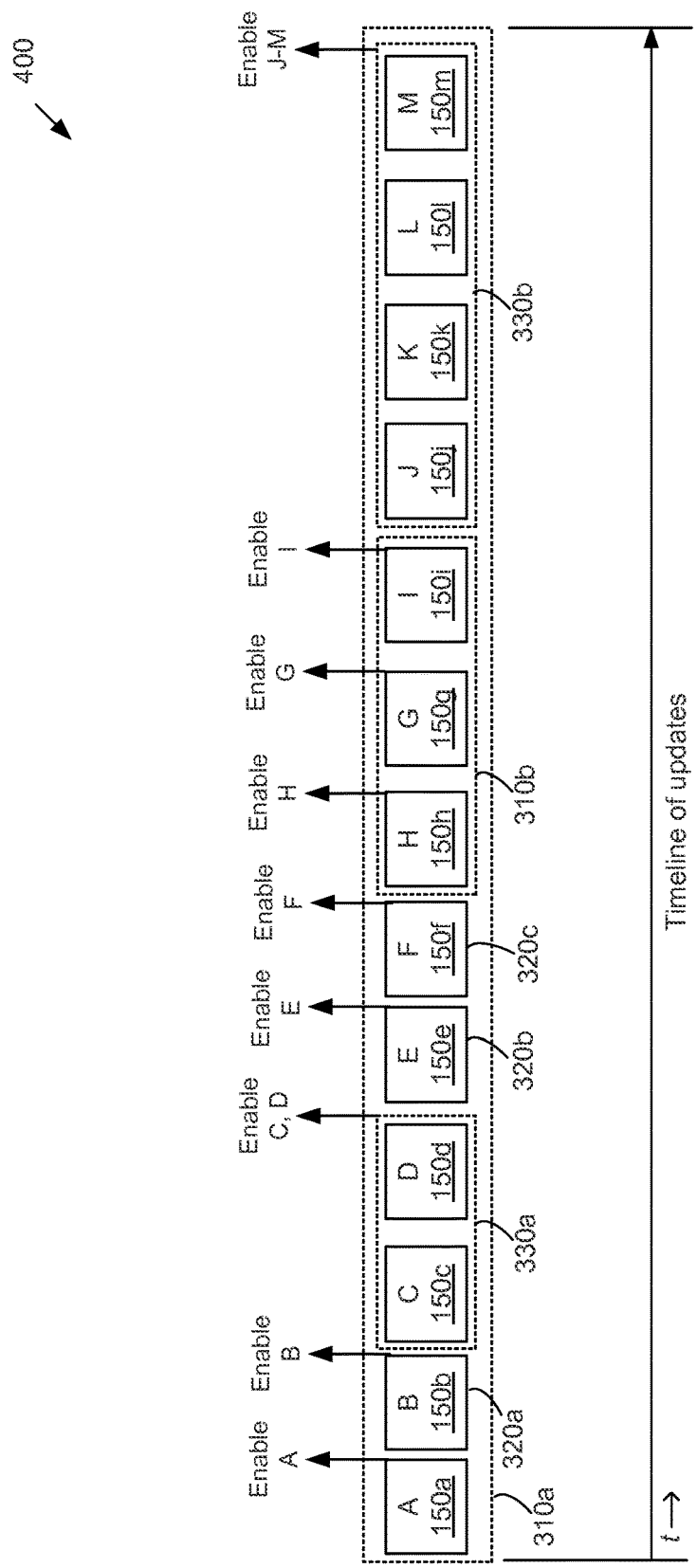
FIG. 4 is a conceptual diagram of an update timeline for the update package of FIG. 2, according to the various embodiments.

Based on the determined relationships and groupings of the updates 150, the update engine 160 then determines the time order of the updates 150 in the update package 200. FIG. 4 is a conceptual diagram of an update timeline 400 for the update package 200 of FIG. 2, according to the various embodiments. As shown in the example of FIG. 4, the update timeline 400 shows an exemplary time sequence for performing the updates 150a-m. The update timeline 400 comprises an update period required for performing all updates 150 in the update package 200.

In some embodiments, for each common grouping of updates, the common update is performed first before all other updates (dependent updates) in the common grouping are performed. In particular, for a common grouping of updates (having a corresponding common grouping of components), the following sequence of steps may be performed in order: the common update is performed on a corresponding common component, the corresponding common component is enabled, a first dependent update is performed on a corresponding first dependent component, the first dependent component is enabled, a second dependent update is performed on a corresponding second dependent component, the second dependent component is enabled, and so forth for each dependent update in the common grouping. By performing the common update on a common component first (relative to the other updates in the common grouping), the common component can be enabled first (relative to the other components in the common grouping). As discussed above, the common component is the component that all other components in the common grouping are dependent on. Therefore, each dependent component in the common grouping may be enabled as soon as the corresponding dependent update is completed, since the common component that each dependent component relies on is already updated and enabled. Therefore, updating the common grouping of components in this manner increases the number of components and the amount of time the components in the common grouping are made available to the user.

As shown in FIG. 4, for the first common grouping 310a comprising updates 150a-m (marked A-M), the common update 150a (marked A) is performed on corresponding common component A first, common component A is then enabled, and then the dependent updates 150b-m (marked B-M) may be performed on corresponding dependent components B-M, respectively. As shown in FIG. 4, for the second common grouping 310b comprising updates 150g-i (marked G-I), the common update 150h (marked H) is performed on the corresponding common component H first, the common component H is then enabled, the dependent update 150g (marked G) is then performed on corresponding dependent component G, the dependent component G is then enabled, the dependent update 150i (marked I) is then performed on corresponding dependent component I, and the dependent component I is then enabled.

In some embodiments, for each interdependent grouping of updates (having a corresponding interdependent grouping of components), all interdependent updates in the grouping are performed first before any of the corresponding interdependent components in the grouping are enabled. For example, for an interdependent grouping of three updates, the following sequence of steps may be performed in order: the first, second, and third interdependent updates are performed on corresponding first, second, and third interdependent components, and then the first, second, and third corresponding interdependent components are enabled. Because all interdependent updates and interdependent components in an interdependent grouping are dependent upon each other, none of the interdependent components may be enabled and made available until all interdependent updates in the interdependent grouping are performed. The interdependent updates may be considered as being performed in a single step. This avoids operational errors as it ensures that no interdependent component is mistakenly enabled (causing errors) before all interdependent updates are performed.

As shown in FIG. 4, for the first interdependent grouping 330a, the interdependent updates 150c-d (marked C-D) are first performed (in one step) on corresponding interdependent components C-D, respectively, then the interdependent components C-D are enabled (either simultaneously or nearly simultaneously). As shown in FIG. 4, for the second interdependent grouping 330b, the interdependent updates 150j-m (marked J-M) are first performed (in one step) on corresponding interdependent components J-M, respectively, then the interdependent components J-M are enabled (either simultaneously or nearly simultaneously).

For an independent update (having a corresponding independent component), the independent update may be performed at any time during the update period and the corresponding independent component enabled as soon as the independent update is completed. As shown in FIG. 4, the first independent update 150b (marked B) is performed on corresponding independent component B, independent component B is then enabled, the second independent update 150e (marked E) is performed on corresponding independent component E, independent component E is then enabled, the third independent update 150f (marked F) is performed on corresponding independent component F, and independent component F is then enabled. In other embodiments, the independent updates may be performed at other times during the update period, such as before or after all other updates in the update package 200 are performed.

In some embodiments, in the unusual circumstance that all updates 150 in a received update package 200 comprise independent updates for independent components, a specialized independent update technique is used to maximize the number of independent components that are made available to the user and the amount of time the independent components are made available to the user. The specialized technique is described below in relation to FIG. 6.

Techniques for Updating Components

Figure 5:
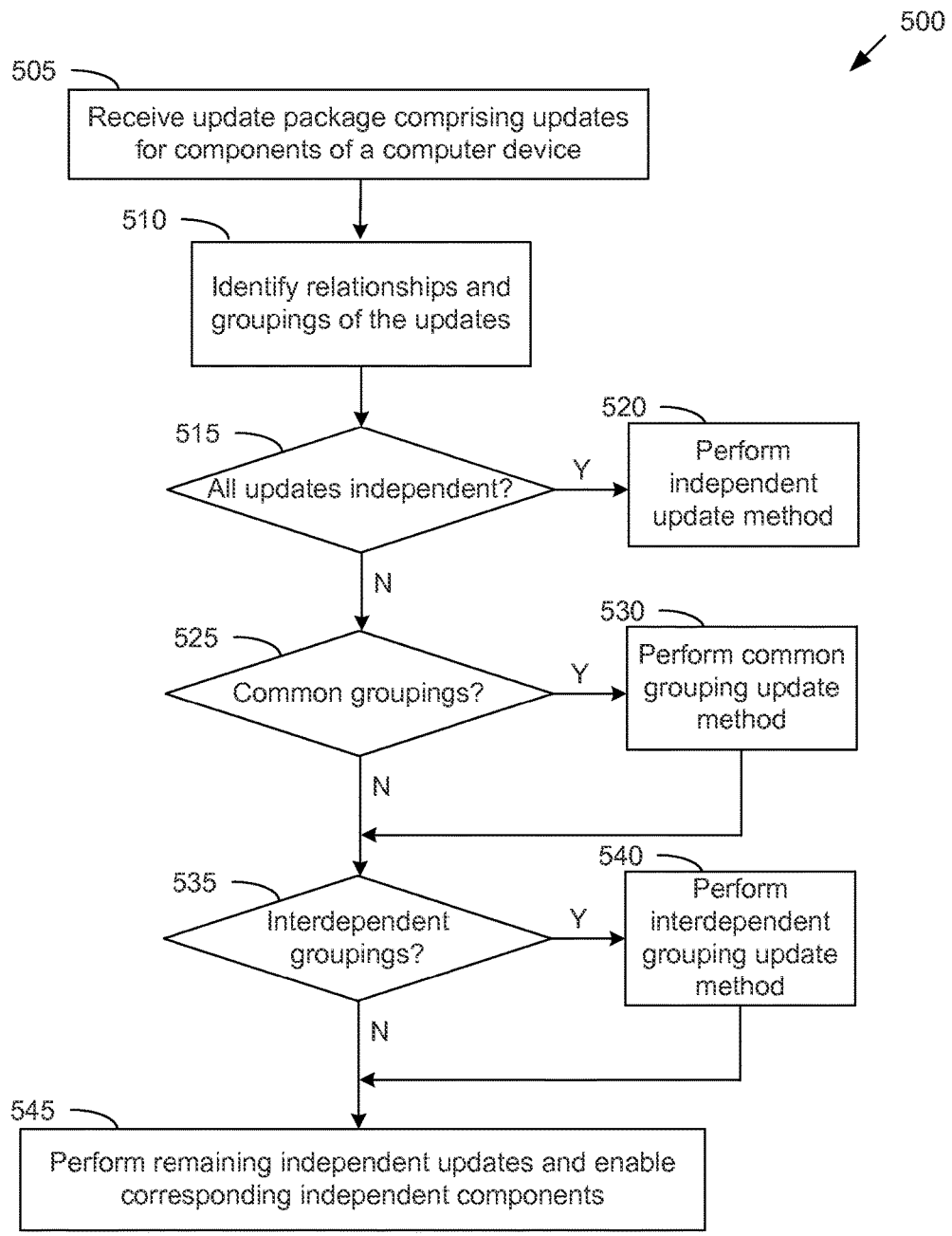
FIG. 5 illustrates a flow diagram of method steps for updating components of a computer device, according to the various embodiments.

FIG. 5 illustrates a flow diagram of method steps for updating components of a computer device, according to the various embodiments. Although the method steps are described in conjunction with the systems of FIG. 1-4, persons skilled in the art will understand that any system configured to perform the method steps, in any order, is within the scope of the various embodiments.

As shown, a method 500 begins at step 505, where the computer device 100 receives an update package 200 comprising a plurality of updates 150 for a plurality of hardware and/or software components of the computer device 100. An update 150 may comprise a firmware update for a corresponding hardware component 110 or an application update for a corresponding application program/service 140. Each update 150 may include metadata that specifies a component identifier (ID) that identifies a corresponding component (hardware component 110 or application program/service 140) to which the update 150 is to be applied.

The update engine 160 then identifies, at step 510, relationships and groupings of the updates 150 in the received update package 200. In some embodiments, the update engine 160 determines any common groupings of updates, any interdependent groupings of updates, and any independent updates in the received update package 200. The update engine 160 may determine relationships and groupings of the updates 150 using a grouping ID (included with each update 150) that specifies a particular grouping that the update 150 belongs to, the type of grouping (common or interdependent grouping), and/or whether the update 150 is a common update. In other embodiments, the update engine 160 may determine relationships and groupings of the updates 150 using an update ID (included with each update 150) and an update table 170 (included with the update package 200).

The update engine 160 then determines, at step 515, whether all updates in the update package 200 were identified as independent updates for independent components. If so, the update engine 160 performs, at step 520, an independent update method 600 (described in relation to FIG. 6) and ends. If not, the method 500 continues at step 525.

At step 525, the update engine 160 determines whether one or more common groupings of updates were identified in the update package 200. If so, the update engine 160 performs, at step 530, a common grouping update method 700 (as described below in relation to FIG. 7) for each identified common grouping and then continues at step 535. If not, the method 500 continues directly to step 535.

At step 535, the update engine 160 determines whether one or more interdependent groupings of updates were identified in the update package 200. If so, the update engine 160 performs, at step 540, an interdependent grouping update method 800 (described in relation to FIG. 8) for each identified interdependent grouping and then continues at step 545. If not, the method 500 continues directly to step 545.

At step 545, the update engine 160 performs any remaining independent updates in the received update package and enables the corresponding independent components. The method 500 then ends. Note that the method steps in the general method 500 may vary so that, for example, the common grouping update method 700 may be performed later, the interdependent grouping update method 800 may be performed earlier or later, and the independent updates may be performed earlier in relation to the other updates being performed in the general method 500.

Figure 6:
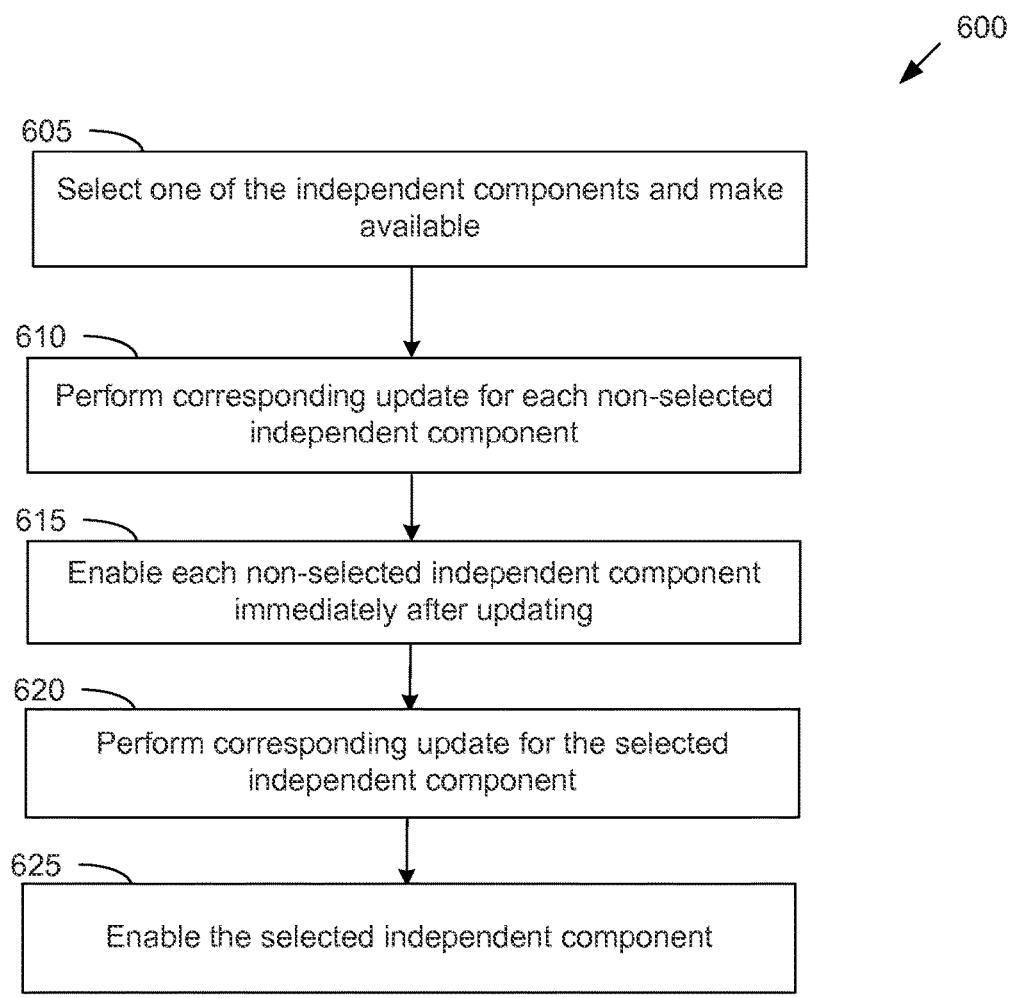
FIG. 6 illustrates a flow diagram of method steps for updating components of a computer device, according other various embodiments.

FIG. 6 illustrates a flow diagram of method steps for updating components of a computer device, according to other various embodiments. Although the method steps are described in conjunction with the systems of FIG. 1-4, persons skilled in the art will understand that any system configured to perform the method steps, in any order, is within the scope of the various embodiments.

The update engine 160 may perform the method steps for the independent update method of FIG. 6 when all updates in the update package 200 are identified as independent updates for a set of independent components. In this situation, at least one of the independent components is made available during the update period. In these embodiments, one selected independent component is made available from the beginning of the update period while the independent updates are being performed on all other independent components. As the update each independent component is completed, the independent component is immediately enabled and made available to the user. After all other independent components are updated, the independent update for the selected independent component is then performed and the selected independent component is enabled afterwards. In some embodiments, the update package 200 comprises a complete device update in which the computer device 100 enters a special programming mode during which none of the components are typically made available for the user.

As shown, a method 600 begins at step 605, where the update engine 160 selects one of the independent components from the set of independent components and makes the selected independent component to be made available from the beginning of the update period. The other independent components in the set of independent components are referred to as non-selected independent components.

At step 610, the update engine 160 performs the corresponding update for each non-selected independent component in the set. At step 615, the update engine 160 enables each non-selected independent component immediately after its update is completed.

At step 620, after all non-selected independent components are updated and enabled, the update engine 160 performs the corresponding update for the selected independent component. At step 625, the update engine 160 enables the selected independent component immediately after its update is completed. The method 600 then ends.

Figure 7:
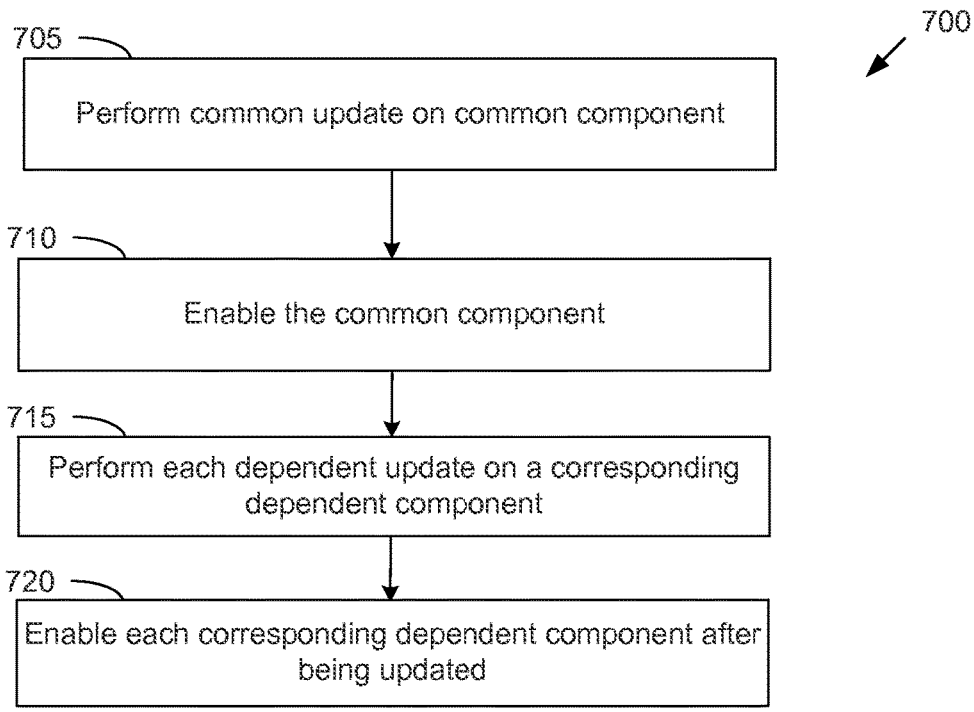
FIG. 7 illustrates a flow diagram of method steps for updating components of a computer device, according to yet other various embodiments.

FIG. 7 illustrates a flow diagram of method steps for updating components of a computer device, according to yet other various embodiments. Although the method steps are described in conjunction with the systems of FIG. 1-4, persons skilled in the art will understand that any system configured to perform the method steps, in any order, is within the scope of the various embodiments. The update engine 160 may perform the methods steps for the common grouping update method of FIG. 7 for each common grouping of updates identified in a received update package 200.

Here, each identified common grouping of updates may comprise at least one common update for updating at least one corresponding common component and at least one dependent update for updating at least one corresponding dependent component. Each dependent update/component in the common grouping is dependent upon the at least one common update/component in the common grouping.

As shown, a method 700 begins at step 705, where the update engine 160 performs the at least one common update on the at least one common component before performing any of the dependent updates in the common grouping. At step 710, update engine 160 enables the corresponding common component.

At step 715, the update engine 160 performs each dependent update in the common grouping on a corresponding dependent component. At step 720, the update engine 160 enables each corresponding dependent component immediately after the corresponding dependent component is updated. The method 700 then ends.

Figure 8:
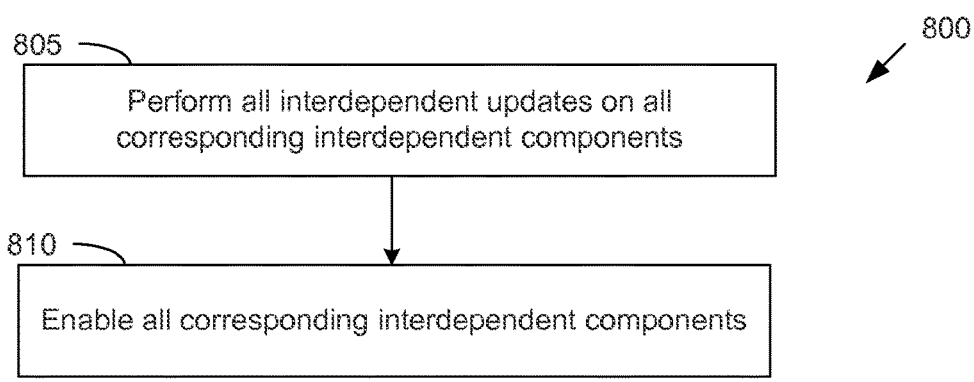
FIG. 8 illustrates a flow diagram of method steps for updating components of a computer device, according to still yet other various embodiments.

FIG. 8 illustrates a flow diagram of method steps for updating components of a computer device, according to still yet other various embodiments. Although the method steps are described in conjunction with the systems of FIG. 1-4, persons skilled in the art will understand that any system configured to perform the method steps, in any order, is within the scope of the various embodiments. The update engine 160 may perform the method steps for an interdependent grouping update method of FIG. 8 for each interdependent grouping of updates identified in a received update package 200.

Here, each identified interdependent grouping of updates may comprise at least two interdependent updates for updating at least two corresponding interdependent components. Each interdependent update/component is dependent upon each of the other interdependent updates/components in the interdependent grouping.

As shown, a method 800 begins at step 805, where the update engine 160 performs all interdependent updates on all corresponding interdependent components in the interdependent grouping. All interdependent updates in the interdependent grouping are performed before any of the corresponding interdependent components are enabled. The interdependent updates may be considered as being performed in a single step. At step 810, the update engine 160 enables all corresponding interdependent components in the interdependent grouping. The method 800 then ends.

In sum, a computing device 100 is configured to receive an update package 200 comprising a plurality of updates 150 for a plurality of hardware and/or software components of the computer device 100. An update engine 160 may identify relationships and groupings of the updates 150 in the received update package 200. The update engine 160 may identify any common groupings of updates, any interdependent groupings of updates, and any independent updates in the received update package 200. The update engine 160 may perform a common grouping update method for all identified common groupings, which includes performing the common update first before performing any dependent updates in the common grouping. The update engine 160 may perform an interdependent grouping update method for all identified interdependent groupings, which includes performing all interdependent updates first before enabling any interdependent component. In the unusual circumstance that all updates in the update package are determined to be independent updates, the update engine 160 may perform an independent update method.

At least one advantage of the disclosed technique is that it allows some components of a computer device to be enabled and made available for use by an end user while other components of the computer device are updated during an update period. The disclosed technique therefore enables a user to access and use at least some features of the computer device during the update period. Another advantage is that when updating a common grouping of components, the disclosed technique increases the number of components and the amount of time the components in the common grouping are made available to the user. Another advantage is that when updating an interdependent grouping of updates, operational errors may be avoided as no interdependent component is enabled until all interdependent updates are performed.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for updating components within a computer device, the method comprising:
    determining that a plurality of updates includes a common grouping of updates, the common grouping of updates including a first update, a second update, and a third update, wherein the first update is associated with a first component, the second update is associated with a second component that is dependent on the first component for being operational, and the third update is associated with a third component that is dependent on the first component for being operational, the first component being a common component for the second and third components, the common update comprising an update for the common component;
    in response to determining that the first update is a common update to the second update and the third update, determining that first update should be performed before performing the second update and before performing the third update; and
    performing the first update on the first component and then enabling the first component before performing the second update on the second component and before performing the third update on the third component.

2. The computer-implemented method of claim 1, wherein the first component comprises a hardware component or an application service, and the first update comprises a firmware update for the first component or a software update for the first component.

3. The computer-implemented method of claim 1, further comprising:
    after enabling the first component, performing the second update on the second component and enabling the second component; and
    after enabling the second component, performing the third update on the third component and enabling the third component.

4. The computer-implemented method of claim 1, further comprising:
    determining that the plurality of updates further includes a fourth update that is associated with a fourth component and interdependent with a fifth update that is associated with a fifth component, wherein the fifth component is interdependent with the fourth component; and
    performing the fourth update on the fourth component and the fifth update on the fifth component before enabling either the fourth component or the fifth component.

5. The computer-implemented method of claim 4, wherein the fourth component and the fifth component are operationally dependent on one another.

6. The computer-implemented method of claim 1, further comprising:
    determining that the plurality of updates further includes a fourth update that is associated with a fourth component, a fifth update that is associated with a fifth component, and a sixth update that is associated with a sixth component, wherein the fourth, fifth, and sixth updates are interdependent and the fourth, fifth, and sixth components are interdependent; and
    performing the fourth update on the fourth component, the fifth update on the fifth component, and the sixth update on the sixth component before enabling either the fourth component, fifth component, or sixth component.

7. The computer-implemented method of claim 6, wherein:
    the fourth component is operationally dependent on the fifth component and sixth component;
    the fifth component is operationally dependent on the fourth component and sixth component; and
    the sixth component is operationally dependent on the fourth component and fifth component.

8. A computer device, comprising:
    a plurality of components;
    a memory that includes an update engine; and
    a processor coupled to the memory, wherein, upon executing the update engine, the processor is configured for:
        determining that a plurality of updates includes a common grouping of updates, the common grouping of updates including a first update, a second update, and a third update, wherein the first update is associated with a first component, the second update is associated with a second component that is dependent on the first component for being operational, and the third update is associated with a third component that is dependent on the first component for being operational, the first component being a common component for the second and third components, the common update comprising an update for the common component;
        in response to determining that the first update is a common update to the second update and the third update, determining that first update should be performed before performing the second update and before performing the third update; and
        performing the first update on the first component and then enabling the first component before performing the second update on the second component and before performing the third update on the third component.

9. The computer device of claim 8, wherein:
    the first component comprises a hardware component or an application service; and
    the first update comprises a firmware update for the first component or a software update for the first component.

10. The computer device of claim 8, wherein the processor is further configured for:
    after enabling the first component, performing the second update on the second component and enabling the second component; and
    after enabling the second component, performing the third update on the third component and enabling the third component.

11. The computer device of claim 8, wherein the computer device comprises a GPS device, cellphone, or vehicle head unit.

12. The computer device of claim 8, wherein the first component comprises a media chip, GPS chip, control-panel chip, or phone chip.

13. The computer device of claim 8, wherein the first component comprises a traffic service, navigation service, media service, network service, or phone service.

14. A non-transitory computer-readable medium storing program instructions that, when executed by a processing unit, cause the processing unit to update components within a computer device by performing the steps of:

determining that a plurality of updates includes a common grouping of updates, the common grouping of updates including a first update, a second update, and a third update, wherein the first update is associated with a first component, the second update is associated with a second component that is dependent on the first component for being operational, and the third update is associated with a third component that is dependent on the first component for being operational, the first component being a common component for the second and third components, the common update comprising an update for the common component;

in response to determining that the first update is a common update to the second update and the third update, determining that first update should be performed before performing the second update and before performing the third update; and performing the first update on the first component and then enabling the first component before performing the second update on the second component and before performing the third update on the third component.

15. The non-transitory computer-readable medium of claim 14, further performing the steps of:

after performing the second update on the second component, enabling the second component; and after enabling the second component, performing the third update on the third component, wherein the first and second components are available while performing the third update.

16. The non-transitory computer-readable medium of claim 14, wherein the first component comprises a hardware component or an application service, and the first update comprises a firmware update for the first component or a software update for the first component.

\* \* \* \* \*